United States Patent [19]

Sekii

[11] Patent Number: 5,539,587
[45] Date of Patent: Jul. 23, 1996

[54] DIGITAL SIGNAL RECORDING APPARATUS HAVING SAMPLING RATE CONVERTER

[75] Inventor: Yasuaki Sekii, Tokyo, Japan

[73] Assignee: Sony Corporation, Tokyo, Japan

[21] Appl. No.: 444,832

[22] Filed: May 18, 1995

Related U.S. Application Data

[63] Continuation of Ser. No. 124,457, Sep. 22, 1993, abandoned.

[30] Foreign Application Priority Data

Oct. 13, 1992 [JP] Japan ................... 4-274536

[51] Int. Cl.⁶ .................... G11B 5/02; G11B 5/09
[52] U.S. Cl. .................... 360/27; 360/33.1; 360/48; 360/61; 369/47; 369/59
[58] Field of Search .................... 360/33.1, 27, 48, 360/61; 369/59, 86, 47

[56] References Cited

U.S. PATENT DOCUMENTS 5,068,716  11/1991  Takayama et al. ............ 348/708
5,159,339  10/1992  Fujita ............................ 348/469

FOREIGN PATENT DOCUMENTS

| 1166354 | 6/1989 | Japan . |
| 1213869 | 8/1989 | Japan . |
| 1298576 | 12/1989 | Japan . |
| 2044575 | 2/1990 | Japan . |
| 2175731 | 12/1986 | United Kingdom . |
| 2223876 | 4/1990 | United Kingdom . |

*Primary Examiner*—Andrew L. Sniezek
*Attorney, Agent, or Firm*—Jay H. Maioli

[57] ABSTRACT

In a digital signal recording apparatus, when a sampling frequency of a digital signal inputted thereto does not correspond to a predetermined sampling frequency set for the digital signal recording apparatus, the sampling frequency of the input digital signal is converted into a signal of the predetermined sampling frequency by a sampling frequency converter, and then is recorded in a recording medium.

5 Claims, 4 Drawing Sheets

| | 0 | | CONTROL | | CHANNEL NUMBER | | 00 | | SAMPLING FREQUENCY | | | CATEGORY CODE | | | 0 |
|---|---|---|---|---|---|---|---|---|---|---|---|---|---|---|---|
| 0 | 1 | 2 | 3 | 4 | 5 | 6 | 7 | 8 | 9 | 10 | 11 | 12 | 13 | 14 | 15 |

SOURCE NUMBER | CHANNEL NUMBER | SAMPLING FREQUENCY | CLOCK ACCURACY

DIGITAL SIGNAL RECORDING APPARATUS HAVING SAMPLING RATE CONVERTER

This is a continuation of application Ser. No. 08/124,457 filed Sep. 22, 1993 now abandoned.

BACKGROUND OF THE INVENTION

This invention relates to a digital signal recording apparatus for recording digital signals in a recording medium.

Currently, as an apparatus for processing digital signals adopted for civilian use, there are a digital audio tape recorder (DAT), a compact disc player (CD player), and a tuner for satellite broadcasting. In the digital signal processing apparatus, a variety of formats for signal processing in order are employed to convert analog signals into digital signals.

In general, when an analog signal is encoded and converted into a digital signal, processing such as sampling and quantization for converting an amplitude value of the signal into a discrete value is carried out. In implementing the sampling, a pulse generated at a constant cycle is used, wherein the cycle is called the sampling frequency. With the various sampling frequencies used in the sampling or the various numbers of quantization bits used in the quantization, different contents and volumes of data of the digital signal converted from the analog signal are produced.

For example, a digital audio tape recorder, that is, so-called R-DAT, for recording signals in slant recording tracks on a magnetic tape using a rotary head is provided with a signal processing format for converting an analog signal into a digital signal.

The signal processing format at the time of recording signals in the R-DAT has a total of five modes for audio PCM data: a mode called 48k mode wherein the number of channels is 2, the sampling frequency is 48 kHz, and the number of linear quantization bits is 16; a mode called 44k mode wherein the number of channels is 2, the sampling frequency is 44.1 kHz, and the number of linear quantization bits is 16; a mode called 32k mode wherein the number of channels is 2, the sampling frequency is 32 kHz, and the number of linear quantization bits is 16; a mode called 32k-4CH mode wherein the number of channels is 4, the sampling frequency is 32 kHz, and the number of non-linear quantization bits is 12; and a mode called 32k-LP mode wherein the number of channels is 2, the sampling frequency is 32 kHz, and the number of non-linear quantization bits is 12.

The variety of formats at the time of recording digital signals as described above may be classified into two groups, that is, a standard mode (SP mode) and a long-play mode (LP mode). In the group of SP mode, plural kinds of sampling frequencies are used, and quantization is carried out with the number of quantization bits being 16 or 12. On the other hand, in the group of LP mode, the sampling frequency of 32 kHz is used, and the number of quantization bits is set to 12. Among the above-mentioned variety of formats, only the 32k-LP mode is of the LP mode, and all the other modes belong to the group of SP mode. Since the data volume of the LP mode is about half the data volume of the SP mode, the recordable time of the recording medium of the LP mode is approximately twice as long as that of the SP mode.

There is an interface format for inputting and outputting digital signals of a digital audio signal recording and reproduction apparatus for civilian use. This digital interface is format constituted as shown in FIG. 1, in consideration of the connection to all devices for inputting and outputting the digital signals as well as the connection between DATs. In this format, an L channel (stereo left channel) and an R channel (stereo right channel), both called sub-frames, are combined to constitute one frame. The signals of the L channel and R channel are time-division multiplexed in a manner of L, R, L, R, . . . , and 192 frames constituting one block are transmitted.

Meanwhile, a preamble indicated by B in FIG. 1 is set when it is both the beginning of the block and the beginning of Channel L. A preamble indicated by M is set when it is not the beginning of the block but is the beginning of Channel L. A preamble indicated by W is set when it is the beginning of any channel other than Channel L.

One sub-frame is constituted by 32 bits, as shown in FIG. 2, normally 20 bits of which and a maximum of 24 bits of which are starting from the LSB, as audio data. The remaining 4 bits are allocated into bits V, U, C, P as synchronization signals. The C bit among the synchronization signals is called a channel status bit, which defines a property of the data. Meanwhile, 4 bits following the synchronization preamble of 4 bits are auxiliary bits.

The channel status bit, which is the C bit, is transmitted for each channel with 192 frames as a unit, as shown in FIG. 3. The channel status bit includes important information, such as, a category code for expressing copy inhibition and types of transmission equipment, channel number, and sampling frequency.

The above-mentioned format of a digital audio interface is described in detail in a Japanese periodical, "NIKKEI ELECTRONICS," Jun. 1, 1987, pp. 109–118.

SUMMARY OF THE INVENTION

However, with the digital signal recording apparatus, it is inconvenient that the sampling frequency of an inputted digital signal does not correspond to the sampling frequency of a digital signal set for the digital signal recording apparatus.

For example, when a digital signal of the SP mode is recorded in the R-DAT set to the LP mode, the mode of the recording apparatus is changed over to the SP mode, or the recording is suspended. In addition, if, in satellite broadcasting, a digital signal using a sampling frequency of 32 kHz which is transmitted at the beginning of a program is changed over to a digital signal using a sampling frequency of 48 kHz in the middle of the program, it may be impossible to record the entire program. Further, when the recording in the LP mode is carried out with mandatory changeover of the mode to the SP mode, a signal for only half of the planned length of time can be recorded, because of the data volume of the SP mode being twice as large as that of the LP mode.

Accordingly, it is an object of the present invention to provide a digital signal recording apparatus for detecting the sampling frequency of a digital signal inputted thereto, for example, the sampling frequency set within the sub-frame, and for converting the sampling frequency of the digital signal, if not the predetermined sampling frequency, into the predetermined sampling frequency for recording.

In accordance with the present invention, there is provided a digital signal recording apparatus for recording digital signals, including: sampling frequency detection means for detecting a sampling frequency of an input digital signal; sampling frequency conversion means for converting the input digital signal into a digital signal of a predetermined sampling frequency; signal changeover means for selecting and changing over between the input digital signal and an output signal from the sampling frequency means, for outputting; and a recording section for recording an output signal from the changeover means in a recording medium, the changeover means selecting and transmitting the output signal from the frequency means to the recording section when the sampling frequency detected by the sampling frequency detection means is not the predetermined sampling frequency.

BRIEF DESCRIPTION OF THE DRAWINGS

FIG. 3 shows information expressed by a channel status bit of the digital audio interface.

DESCRIPTION OF A PREFERRED EMBODIMENT

A preferred embodiment of the present invention will now be explained with reference to the accompanying drawings.

Figure 4:
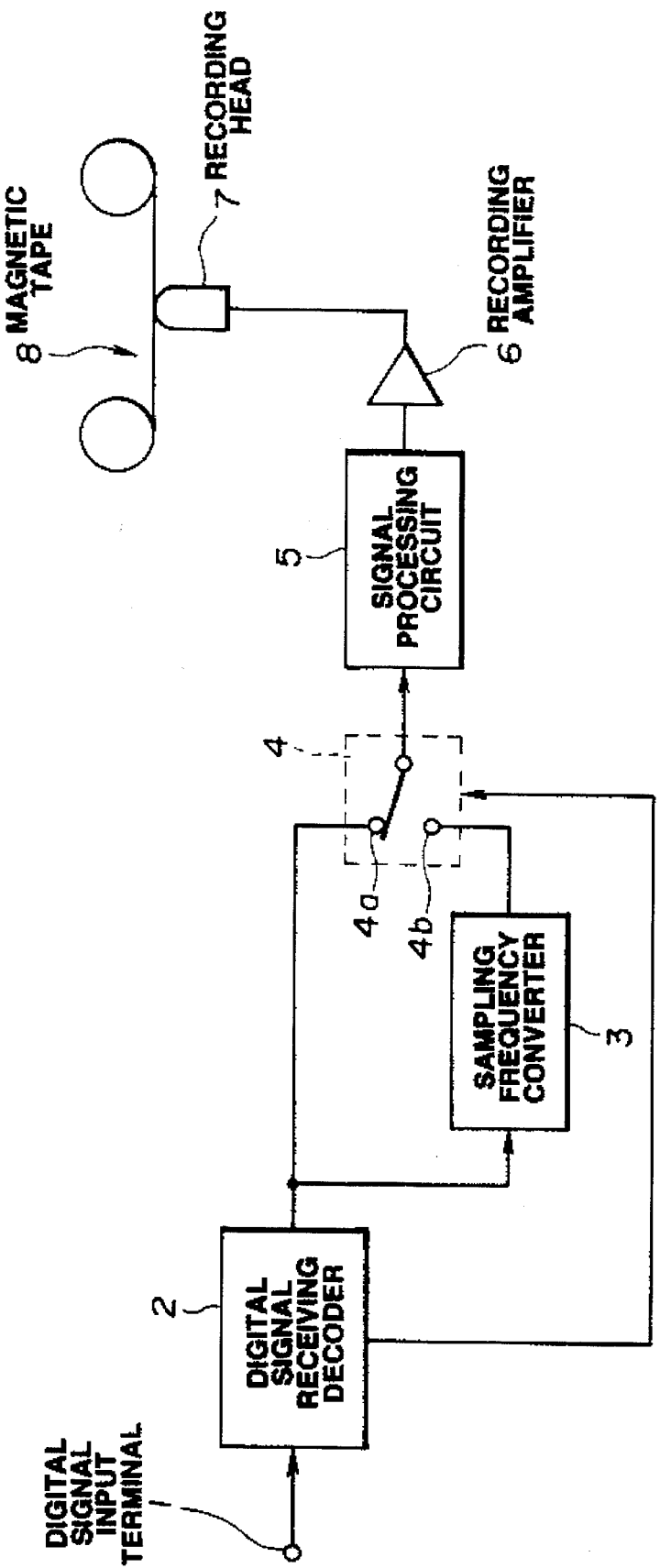
FIG. 4 is a block diagram of a digital signal recording apparatus according to the present invention.

FIG. 4 is a block diagram showing a schematic arrangement of a digital signal recording apparatus. In the apparatus of this embodiment shown in FIG. 4, a sampling frequency converter and a digital signal changeover switch are added to a normal digital signal recording apparatus.

Figure 1:
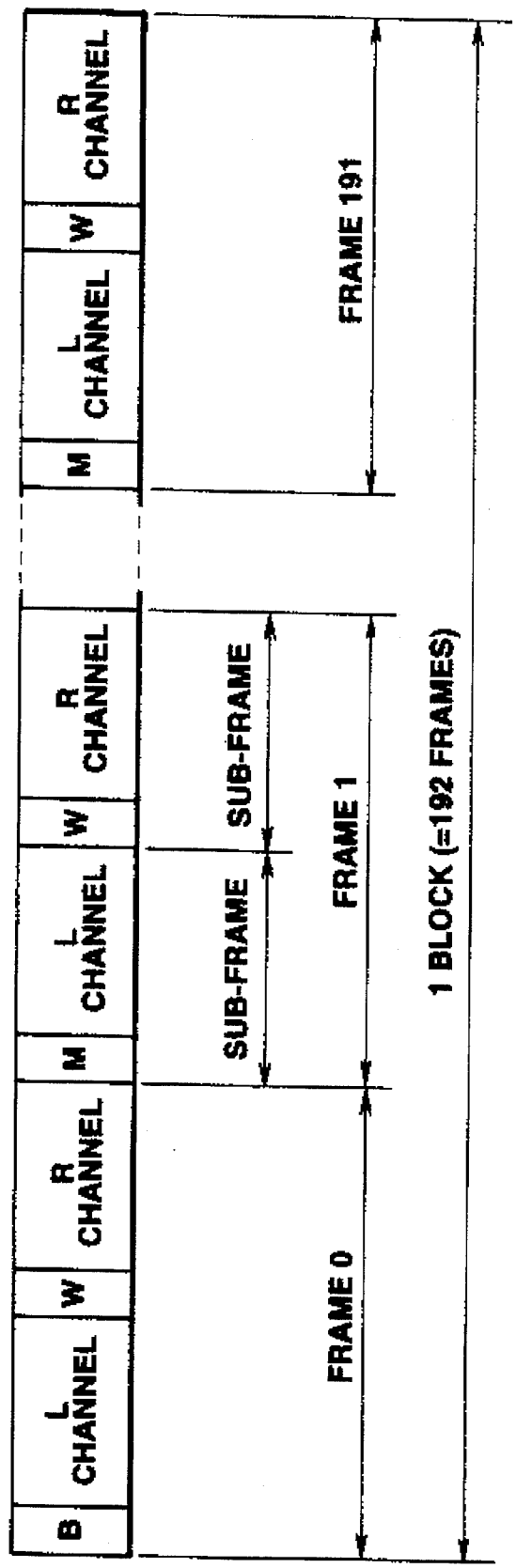
FIG. 1 shows a frame format of digital audio interface.
Figure 2:
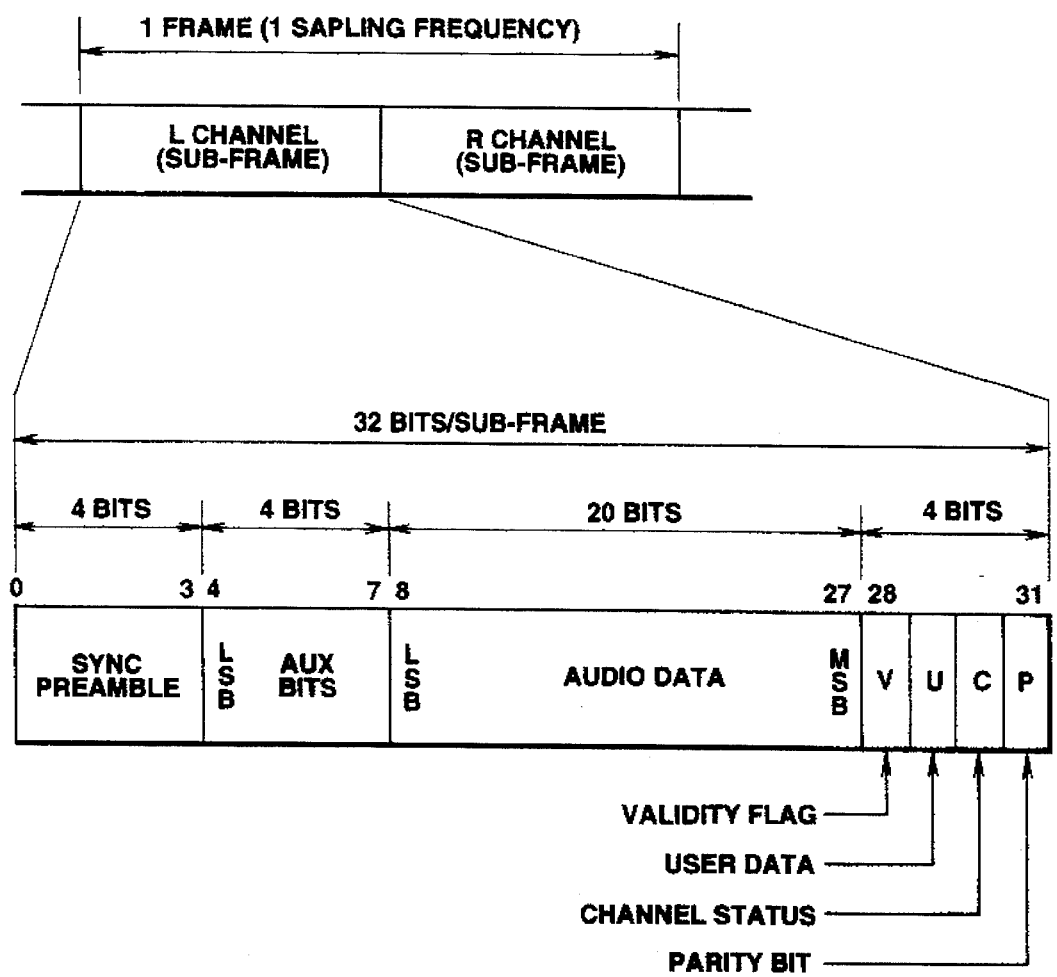
FIG. 2 shows a sub-frame format of the digital audio interface.

In FIG. 4, a digital signal of a certain sampling frequency inputted via a digital signal input terminal 1 is decoded by a digital signal receiving decoder 2 on the basis of the interface format shown in FIG. 2. The sampling frequency of the input digital signal is detected by decoding information of a channel status bit within a sub-code of the digital interface, or by directly detecting the sampling rate of the input digital signal.

When the sampling frequency detected by the digital signal receiving decoder 2 is a predetermined sampling frequency, the changeover switch 4 is turned to a terminal 4a. On the other hand, when the detected sampling frequency is not the predetermined sampling frequency, the changeover switch 4 is turned to a terminal 4b.

The sampling frequency converter 3 converts the sampling frequency of the input digital signal into the predetermined sampling frequency. The method of converting the frequency by the sampling frequency converter 3 is exemplified by a method wherein an input digital signal is converted into an analog signal and then is converted again into a digital signal with a predetermined sampling frequency, or a method wherein an input digital signal is oversampled or interpolated through a digital filter. If the method of digitally converting the frequency through the digital filter is employed, deterioration of sound quality is less than in the case of carrying out analog/digital (A/D) conversion, of an analog signal, with a predetermined sampling frequency.

The technique of converting the sampling rate by means of digital signal processing is described in, for example, U.S. Pat. No. 5,159,339 (application Ser. No. 695,713, filed on Feb. 15, 1991, and U.S. Pat. No. 5,068,716 (application Ser. No. 499,679, filed on Mar. 27, 1990), both assigned to Sony Corporation.

When the sampling frequency of the output signal from the digital signal receiving decoder 2 is the predetermined sampling frequency, the output signal is supplied to a signal processing circuit 5 via a terminal 4a. When the sampling frequency of the output signal from the digital signal receiving decoder 2 is a frequency other than the predetermined sampling frequency, the output signal is inputted to the signal processing circuit 5 via the sampling frequency converter 3 and the terminal 4b.

The digital signal is converted into a recording signal by the signal processing circuit 5 on the basis of the format of the input digital signal, and the recording signal thus produced is recorded via a recording amplifier 6 and a recording head 7 into a magnetic tape 8.

The above-described digital signal recording apparatus is exemplified by an R-DAT for recording digital signals slantingly on a magnetic tape by using a rotary magnetic head. The R-DAT is explained hereinafter.

The signal processing format for the R-DAT at the time of recording is provided with different modes having various sampling frequencies. These modes are classified into two groups, that is, an SP mode, which is a standard mode, and an LP mode, wherein the data volume is half of that in the SP mode.

The predetermined sampling frequency of 32 kHz in the LP mode is set for the R-DAT, for example. If the sampling frequency set for the R-DAT is 32 kHz as mentioned above, the sampling frequency converter 3 converts any sampling frequency other than 32 kHz into the sampling frequency of 32 kHz at all times for outputting.

The sampling frequency of a digital signal inputted via the digital signal input terminal of the R-DAT is detected. If the sampling frequency of the input digital signal is, for example, 44.1 kHz and does not coincide with the sampling frequency 32 kHz set for the R-DAT, the changeover switch 4 is turned to the terminal 4b so as to select an output from the sampling frequency converter 3. On the other hand, if the sampling frequency of the input digital signal is 32 kHz, the changeover switch 4 is turned to the terminal 4a.

Accordingly, an output signal from the changeover switch 4 has the sampling frequency of 32 kHz at all times, and is transmitted to the signal processing circuit 5. The signal inputted in the signal processing circuit 5 is provided with sub-data, and then is processed by predetermined modulation to be a recording signal. The recording signal thus produced is transmitted to the recording amplifier, wherein the recording level of the signal is adjusted, and then is recorded on a magnetic tape via a magnetic head.

As described in the above example, it is possible to record the input digital signal even when the sampling frequency of the input digital signal is different from the predetermined sampling frequency. In addition, since the data volume of the LP mode is half the data volume of the SP mode, recording for twice as long as the standard tape recording time becomes possible.

In the above-described embodiment, the present invention is applied to the digital signal recording apparatus characterized in magnetic recording using a magnetic recording medium. However, the present invention is not limited thereto, but can be applied to any digital signal recording apparatus using an audio signal or a video signal as the input digital signal.

Meanwhile, the recording medium, not shown, can be an optical recording medium as well as the magnetic recording medium. The optical recording medium can be a magneto-optical recording medium, a phase-change optical recording medium, an organic optical recording medium, or a PHB optical recording medium. The recording medium can be in the form of a tape, a disc or a card.

In a recording method using the magneto-optical disc, the magneto-optical recording medium, to which an external magnetic field is applied in a direction of recording, is then heated by irradiation with a laser light, so as to diminish coercive force and reverse magnetization into the direction of the external magnetic field, thus recording information by means of the direction of the magnetic domain. In a recording method using the phase-change optical recording medium, a reversible change between two states, such as a change between amorphous and crystal or an intercrystalline change, utilizing a change in the atomic arrangement, is repeated, thereby carrying out recording and deletion.

As is clear from the above description, in the digital signal recording apparatus according to the present invention, there is provided the frequency detection means for detecting the sampling frequency of the input digital signal, the sampling frequency conversion means for converting the input digital signal into a digital signal of a predetermined sampling frequency, the changeover means for selecting and changing over for outputting the input digital signal or an output signal from the frequency conversion means, and the recording section for recording an output signal from the changeover means in a recording medium, the changeover means selecting and transmitting the output signal from the frequency conversion means to the recording section when the sampling frequency detected by the sampling frequency detection means is not the predetermined sampling frequency. Therefore, the digital signal can be recorded with the predetermined sampling frequency even when the sampling frequency of the digital signal inputted to the digital signal recording apparatus is not known. In addition, since it suffices to set the predetermined sampling signal for the digital signal recording apparatus, the digital signal recording apparatus allows easy handling.

Furthermore, even when, during reception of a digital signal of a certain sampling frequency, a digital signal of another sampling frequency is continuously received, the reception and recording can be carried out continuously without resetting the sampling frequency for the digital signal recording apparatus.

What is claimed is:

1. A digital signal recording apparatus for recording input digital signals at a predetermined sampling frequency, comprising:

a digital signal receiving decoder for decoding an input digital signal having a predetermined digital interface format for producing a decoded digital signal and for indirectly determining a sampling frequency of the input digital signal by decoding a channel status bit in a sub-code of a sub-frame of said predetermined digital interface format and also producing a sampling frequency indication signal based on the decoding of the channel status bit;

frequency conversion means for converting a sampling frequency of the decoded digital signal into the predetermined sampling frequency;

changeover means for carrying out changeover of an output signal between the decoded digital signal from the digital signal receiving decoder and the decoded digital signal having the converted sampling frequency from the frequency conversion means in response to said frequency indication signal; and a recording section for recording the output signal from the changeover means in a recording medium, wherein the changeover means changes over the decoded digital signal having the converted sampling frequency from the frequency conversion means when the sampling frequency indicated by the digital signal receiving decoder is other than the predetermined sampling frequency.

2. The digital signal recording apparatus as claimed in claim 1 wherein the recording medium comprises a magnetic recording medium.

3. The digital signal recording apparatus as claimed in claim 1 wherein the recording section uses an optical recording medium as the recording medium.

4. The digital signal recording apparatus as claimed in claim 1 wherein the input digital signal received by the decoder is an audio signal.

5. The digital signal recording apparatus as claimed in claim 1 wherein the input digital signal received by the decoder is a video signal.

\* \* \* \* \*